United States Patent Office 3,164,531
Patented Jan. 5, 1965

3,164,531
PROCESS FOR PREPARING L-GLUTAMIC ACID
Hiroshi Okada, Tokyo, Koichi Takinami and Haruo Tsuri, Kanagawa-ken, Isamu Shiio, Tokyo, and Toshinao Tsunoda, Kanagawa-ken, Japan, assignors to Ajinomoto Co., Inc., and Sanraku-Ocean Co., Inc., Tokyo, Japan
No Drawing. Filed Oct. 12, 1962, Ser. No. 230,275
Claims priority, application Japan, Oct. 19, 1961, 36/37,315; June 27, 1962, 37/26,269
10 Claims. (Cl. 195—47)

This invention relates to the manufacture of L-glutamic acid by fermentation, and more particularly to a carbon source for the fermentative preparation of glutamic acid.

Many microorganisms are known to be capable of producing glutamic acid from suitable carbon and nitrogen sources by fermentation. In typical industrially employed fermentation processes, glucose is the carbon source. The nitrogen source may be any one or a mixture of ammonia, ammonium sulfate, ammonium nitrate, or urea. The glutamic acid is produced when a wide variety of microorganisms is cultured aerobically at a temperature between about 27° C. and 33° C. on a nutritive medium containing such carbon and nitrogen sources together with certain well known minor constituents beneficial for the metabolism of the microorganisms.

Glucose is a relatively costly source of carbon, and the primary object of this invention is the provision of a less costly carbon source for media on which glutamic acid producing microorganisms can be cultured.

Cane molasses, sugar beet molasses, raw cane or beet sugar, cane juice (thin juice) and extracted beet juice (raw juice), are available abundantly at low cost. Commercial molasses contain about 50% sucrose and the several juices also are rich in sucrose. Attempts have previously been made to employ the sucrose of molasses and of other raw and intermediate sugar products as a carbon source for the fermentative production of glutamic acid. These attempts have failed to result in practical industrial processes for two primary reasons. Molasses and other sugars contain colored substances which inhibit the fermentative production of glutamic acid by microorganisms. They can be removed by adsorption on diatomaceous earth and the like. Molasses and other raw or intermediate sugar products also contain substantial amounts of biotin and of other substances which promote the growth of the microorganisms at the expense of their glutamic acid production. Therefore, in spite of low cost, molasses and other inexpensive sucrose containing materials have not heretofore been an economical carbon source for glutamic acid fermentation.

The amounts of growth promoting constituents in the several raw and intermediate products mentioned above vary but they are approximately equally effective with respect to all microorganisms known to produce L-glutamic acid from sucrose by fermentation, such as the several species of the genera Micrococcus, Brevibacterium, Corynebacterium, Bacillus and Microbacterium. 100 grams cane molasses contain growth promoting substances equivalent to 300–700 micrograms biotin. The equivalent biotin weights in micrograms per 100 grams sucrose content are 30–50 for thin cane juice, 20–40 for raw cane sugar. Beet sugar molasses contains only the equivalent of 30–40 micrograms biotin per 100 grams sucrose and raw beet sugar the equivalent of 50–70 micrograms.

We have found that the metabolism of all microorganisms normally employed for producing glutamic acid can be influenced by adding non-ionic surface active agents to culture media whose carbon source is molasses or sucrose in other forms. Glutamic acid can be produced in high yields and high concentration in culture media which contain molasses or other sources of sucrose and surface active agents.

The following table lists the results of experiments in which several surface active agents were added to culture media containing 10 g./dl. of sucrose in the form of beet molasses, 0.1 g./dl. of $KH_2PO_4$, 0.04 g./dl. of $$MgSO_4 \cdot 7H_2O$$

and 0.6 g./dl. of urea. The media were inoculated with *Brevibacherium lactofermentum*, strain No. 2256 (ATCC No. 13869), and cultured at 30° C. for 48 hours, with shaking. The pH of the media was maintained in the alkaline range near pH 7.5 by adding 45% urea solution. The first column of the table lists trademarks of surface active agents used. The second column lists the initial surface active agent concentration in percent. The third column lists the glutamic acid concentration produced in the media.

TABLE 1

| Surface Active Agent | Surface Active Agent Concentration (Percent) | Glutamic Acid Concentration, g./dl. |
|---|---|---|
| Tween 20 | 0 | 1.28 |
| Do | 0.01 | 2.81 |
| Do | 0.05 | 2.25 |
| Do | 0.1 | 2.41 |
| Tween 40 | 0.01 | 2.22 |
| Do | 0.05 | 2.68 |
| Do | 0.1 | 2.91 |
| Tween 80 | 0.001 | 2.17 |
| Do | 0.01 | 2.13 |
| Do | 0.1 | 2.18 |
| Span 20 | 0.01 | 1.83 |
| Do | 0.05 | 2.71 |
| Do | 0.1 | 2.99 |
| Aldo 28 | 0.01 | 2.72 |
| Do | 0.1 | 3.57 |
| Do | 1.0 | 2.17 |

Tween 20 is a polyoxyalkylene derivative of sorbitan monolaurate.
Tween 40 is the corresponding derivative of sorbitan monopalmitate.
Tween 80 is the corresponding derivative of sorbitan monooleate.
Span 20 is sorbitan monolaurate.
Aldo 28 is glyceryl monostearate.

The effect of the surface active agents on the growth of glutamic acid producing microorganisms is illustrated in Table 2 which lists results of tests performed on microorganisms grown on media containing varying amounts of surface active agent. In all tests, the culture medium contained 10 g./dl. molasses, 0.1 g./dl. $KH_2PO_4$, 0.04 g./dl. $MgSO_4 \cdot 7H_2O$, 2 p.p.m. Fe ions. 2 p.p.m. Mn ions, 0.8 g./dl. urea, 5γ/l. biotin, and 0.5 ml./dl. soybean protein hydrolyzate. The microorganism employed was *Brevibacterium lactofermentum*, strain No. 2256 (ATCC No. 13869). After 42 hours' incubation, the bacterial growth was determined by measuring the absorbency of the culture medium at a wavelength of 562 millimicrons and the residual sucrose was measured.

TABLE 2

| Surface Active Agent Concentration (Percent) | Turbidity of culture | Residual sucrose Concentration, g./dl. |
|---|---|---|
|  | 0 | 0.59 | 0.71 |
| Span 20 | 0.01 | 0.61 | 0.71 |
| Do | 0.1 | 0.51 | 5.05 |
| Span 60 | 0.05 | 0.57 | 1.38 |
| Do | 0.15 | 0.62 | 2.48 |
| Tween 60 | 0.01 | 0.61 | 0.67 |
| Do | 0.05 | 0.48 | 5.03 |
| Aldo 28 | 0.01 | 0.65 | 0.71 |
| Do | 0.2 | 0.62 | 3.21 |

NOTE.—Span 60 is sorbitan monostearate. Tween 60 is the polyoxyalkylene derivative of sorbitan monostearate.

It is evident from Table 2 that the surface active agents do not inhibit the normal growth of bacterial producing glutamic acid. When a large excess of surface active agent is added to the medium, the microorganisms cannot metabolize sucrose to produce glutamic acid, as will become further evident from Table 3. Addition of surface active agents in moderate amounts unfavorably affects the proliferation of microorganisms relative to the glutamic acid produced.

Therefore, the metabolism of microorganisms producing glutamic acid can be controlled to produce glutamic acid in high yield by addition of surface active agents in amounts smaller than those which inactivate the glutamic acid producing enzyme in the microbial cells.

Table 3 shows that an excessive or an insufficient initial concentration of surface active agent reduces the yield. The culture medium in each test contained 10 g./dl. beet molasses, 0.1 g./dl. $KH_2PO_4$, 0.04 g./dl. $MgSO_4 \cdot 7H_2O$, and 0.6 g./dl. urea. The surface active agent used was Tween 60. The incubation proceeded for 48 hours at 30° C. with shaking.

TABLE 3

| Surface Active Agent Concentration (Percent) | Residual Sugar (g./dl.) | Glutamic Acid Produced (g./dl.) |
|---|---|---|
| 0.001 | 0.66 | 2.25 |
| 0.005 | 0.72 | 2.31 |
| 0.01 | 0.69 | 2.52 |
| 0.05 | 0.92 | 3.86 |
| 0.1 | 1.93 | 4.00 |
| 0.3 | 3.00 | 2.30 |
| 0.5 | 6.11 | 1.50 |
| 1.0 | 9.95 | |

The following detailed examples further illustrate the fermentative manufacture of L-glutamic acid in the presence of surface active agents from culture media containing molasses or other forms of sucrose as a carbon source.

Example 1

Beet molasses containing 47 g./dl. sucrose was diluted with water to approximately two times its initial volume. Diatomaceous earth was added to the diluted molasses which was then filtered. The filtrate was further diluted with water to a sucrose concentration of 10 g./dl. A culture medium was prepared from this sucrose solution by addition of 0.1 g./dl. potassium dihydrogen phosphate, 0.04 g./dl. magnesium sulfate heptahydrate, 0.6 g./dl. urea and 0.1 g./dl. Tween 60. The pH of the medium was adjusted to 7.0 with aqueous ammonia solution. 20 ml. batches of the culture medium were placed in 500 ml. flasks, sterilized at 120° C. for 15 minutes, and inoculated with *Brevibacterium lactofermentus*, strain No. 2256 (ATCC No. 13869), which had previously been cultured for 24 hours. The fermentation was permitted to proceed at 31° C. for 48 hours under shaking. An aqueous 45% solution of urea was added to each flask during fermentation to keep the culture medium slightly alkaline. The medium after fermentation contained 4.00 g./dl. L-glutamic acid. The culture broth obtained after fermentation was filtered in order to remove the cells therefrom, concentrated under reduced pressure, and its pH was adjusted to the isoelectric point of glutamic acid (3.2) by means of hydrochloric acid. When the adjusted broth was kept overnight in an ice box, 33.5 g. of crystallized crude L-glutamic acid were obtained from each liter of the original broth.

Example 2

An aqueous solution of 10 g./dl. sucrose prepared in the manner described in Example 1, was mixed with 0.1 g./dl. potassium dihydrogen phosphate, 0.04 g./dl. magnesium sulfate heptahydrate, 0.6 g./dl. urea, and 0.1 g./dl. Aldo 28. The pH of the culture medium so obtained was adjusted to 7.0 with aqueous ammonia solution. 20 ml. batches of the culture medium were placed in 500 ml. flasks, sterilized, and then inoculated with *Brevibacterium flavum*, strain No. 2247 (ATCC No. 14069). The fermentation was permitted to proceed at 31° C. for 42 hours under shaking. A 45% aqueous solution of urea was added to each flask during fermentation to keep the culture medium slightly alkaline. From each liter of said broth 28 grams of crystallized crude L-glutamic acid were obtained in the manner described in Example 1.

Example 3

Ten liters of an aqueous solution of beet molasses containing 47 percent sucrose were diluted with an equal volume of water with thorough stirring. 500 grams of diatomaceous earth were added to the diluted solution, which was thereafter filtered with suction. A culture medium was prepared from 6.6 liters of the filtrate, 14 grams of potassium dihydrogen phosphate, 5.6 grams of magnesium sulfate heptahydrate and 14 grams of Tween 60. The pH of the medium was adjusted to 7.0 with ammonium hydroxide. It was diluted to 13.3 liters and placed in a 20 liter stainless steel fermentation jar. The medium in the jar was sterilized at 115° C. for 20 minutes, cooled, and inoculated with 700 ml. of a seed liquor of *Brevibacterium lactofermentus*, strain No. 2256 (ATCC No. 13869), which had been cultured 15 hours. Fermentation was carried out in the jar at 31° C. with aeration and agitation. During fermentation, gaseous ammonia was introduced into the jar together with the air to keep the pH value of the culture medium at approximately 7.8. 48 hours after inoculation, fermentation was completed, and the concentration of L-glutamic acid in the fermentation broth was 4.38 grams per deciliter. The broth was filtered after addition of 1.5 percent of diatomaceous earth to remove the bacterial cells. The filtrate was decolorized by addition of activated carbon and filtration, and finally concentrated under reduced pressure. When the residue was acidified to pH 3.2 with hydrochloric acid and cooled overnight in an ice box, 510 grams of crude L-glutamic acid were precipitated and recovered by filtration.

A culture medium containing 12 g./dl. sucrose in the form of sugar beet molasses, 0.1 g./dl. diammonium hydrogen phosphate, 0.04 g./dl. magnesium sulfate heptahydrate and 0.6 g./dl. urea, was prepared in the manner described in Example 1. 20 ml. batches of the culture medium were placed in 500 ml. flasks, sterilized, and then inoculated with *Brevibacterium lactofermentus*, strain No. 2256 (ATCC No. 13869) previously prepared by culturing for 24 hours. The fermentation was permitted to proceed at 31° C. under shaking. An aqueous solution of urea was added to each flask during fermentation to keep the culture medium slightly alkaline. Six hours after inoculation, the flasks were divided into two groups. The contents of each flask in the first group were mixed with 0.05% Tween 60 and culturing of both groups then continued. The contents of the flasks in the second group were mixed with 0.1% Tween 60 ten hours after inoculation and fermentation was continued. The additions of surface active agent were made under sterile condition. Sixty-three hours after inoculation, fermentation was terminated in both groups of flasks. The concentration of L-glutamic acid accumulated in the broth was 5.56 g./dl. in the first group, and 4.24 g./dl. in the second group.

Example 5

Crystals of raw beet sugar were dissolved in water to form a 20% solution. Diatomaceous earth was added to the solution which was then filtered. The filtrate was further diluted with water to a sucrose concentration of 10 g./dl. A culture medium was prepared from this sucrose solution by addition of 0.3 g./dl. potassium dihydrogen phosphate, 0.04 g./dl. magnesium sulfate hydrate, 0.6 g./dl. urea and 0.04 g./dl. Tween 60. The pH of the medium was adjusted to 7.0 with aqueous ammonia solution. 20 ml. batches of the culture medium were placed in 500 ml. flasks, sterilized at 120° C. for 15 minutes, and inoculated with *Brevibacterium lactofermentus*, strain No. 2256 (ATCC No. 13869), which had previously been cultured for 24 hours. The fermentation was permitted to proceed at 31° C. for 48 hours under shaking. An aqueous 45% solution of urea was added to each flask during fermentation to keep the culture medium slightly alkaline. The medium after fermentation contained 3.87 g./dl. L-glutamic acid. The culture broth obtained after fermentation was filtered in order to remove the cells, concentrated under reduced pressure, and its pH was adjusted to the isoelectric point of glutamic acid (3.2) by means of hydrochloric acid. When the adjusted broth was kept overnight in an ice box, 34.1 g. of crystallized crude L-glutamic acid were obtained from each liter of the original broth.

Example 6

Crystals of raw cane were dissolved in water, and diatomaceous earth was added to the solution which was then filtered. The filtrate was further diluted with water to a sucrose concentration of 10 g./dl., and a culture medium was prepared from this solution by the addition of 0.2 g./dl. diammonium hydrogen phosphate, 0.04 g./dl. magnesium sulfate heptahydrate, 0.6 g./dl. urea and 0.03 g./dl. Aldo 28. The pH of the medium was adjusted to 7.0 with aqueous ammonia solution. 20 ml. batches of the culture medium were placed in 500 ml. flasks, sterilized, and inoculated with *Brevibacterium flavum*, strain No. 2247 (ATCC No. 14069). The fermentation was permitted to proceed at 31° C. for 42 hours under shaking. An aqueous solution of urea was added to each flask during fermentation to keep the culture medium slightly alkaline. 27 grams of crystallized crude L-glutamic acid were obtained from each liter of the original broth in the manner described in Example 1.

Example 7

L-glutamic acid fermentation was carried out in the manner described in Example 6, but using thin sugar cane juice and 0.05 g./dl. Span 60 instead of the raw cane sugar and Aldo 28. The sugar cane juice was freshly pressed. The concentration of L-glutamic acid in the fermentation broth was 3.54 g./dl.

Example 8

1.4 kilograms of raw cane sugar were dissolved in 10 liters water. 500 grams diatomaceous earth were added to the solution, which was then filtered with suction. A culture medium was prepared from 6.6 liters of the filtrate, 28 grams potassium dihydrogen phosphate, 5.6 grams magnesium sulfate heptahydrate and 4.2 grams Tween 60. The pH of the medium was adjusted to 7.0 with aqueous ammonia. It was diluted to 13.3 liters and placed in a 20 liters stainless steel fermentation jar. The medium in the jar was sterilized at 115° C. for 20 minutes, cooled, and inoculated with 700 ml. of a seed liquor of *Brevibacterium lactofermentus*, strain No. 2256 (ATCC No. 13869), which had been cultured 15 hours. Fermentation was carried out in the jar at 31° C. with aeration and agitation. During fermentation, gaseous ammonia was introduced into the jar together with air at such a rate that the pH value of the culture medium was kept at approximately 7.8. 48 hours after inoculation, fermentation was terminated. The concentration of L-glutamic acid in the fermentation broth was 4.52 g./dl. The broth was filtered after addition of 1.5 percent diatomaceous earth to remove the bacterial cells. The filtrate was decolorized by the addition of activated carbon, and finally concentrated under reduced pressure. When the residue was acidified to pH 3.2 with hydrochloric acid and cooled overnight in an ice box, 531 grams of crude L-glutamic acid were precipitated and recovered by filtration.

Example 9

100 ml. of raw sugar beet juice were diluted with water to adjust the sucrose concentration to 10%. A culture medium was prepared from the diluted solution by addition of 0.2% potassium dihydrogen phosphate, 0.04% magnesium sulfate heptahydrate and 0.05% Tween 40. 20 ml. batches of the culture medium were placed in 500 ml. flasks, sterilized at 120° C. for 20 minutes, and inoculated with 5% of a seed liquor of *Brevibacterium lactofermentus*, strain No. 2256 (ATCC No. 13869). The fermentation was permitted to proceed at 31° C. for 44 hours under shaking, and an aqueous 45% solution of urea was added to each flask during fermentation to keep the culture medium slightly alkaline. The medium after fermentation contained 4.15 g./dl. L-glutamic acid. When the fermentation was carried out in the same manner but without Tween 40, the concentration of L-glutamic acid in the culture medium was 1.06 g./dl.

Example 10

Blackstrap molasses was dissolved in water. Diatomaceous earth was added and the solution was filtered with suction. A culture medium was prepared from 6.6 liters of the clarified solution, 14 grams potassium dihydrogen phosphate, 5.6 grams magnesium sulfate heptahydrate, and 56 grams Tween 40. The pH of the medium was adjusted to 7.0 with ammonia. It was diluted to 13.3 liters and placed in a 20 liter stainless steel fermentation jar. The medium in the jar was sterilized at 115° C. for 20 minutes, cooled, and inoculated with 700 ml. of a seed liquor of *Brevibacterium saccharolyticum* (ATCC No. 14066), which had been cultured 15 hours. Fermentation was carried out in the jar at 31° C. with aeration and agitation. During fermentation gaseous ammonia was introduced into the jar together with the air whereby the pH value of the culture medium was kept at approximately 7.8. 48 hours after inoculation, the fermentation was terminated. The concentration of L-glutamic acid in the fermentation broth was 4.13 grams per deciliter.

Example 11

Blackstrap molasses was dissolved in water and diatomaceous earth was added to the solution which was then filtered with suction. A culture medium was prepared from 6.6 liters of the clarified solution, 14 grams potassium dihydrogen phosphate, 5.6 grams magnesium sulfate heptahydrate. The pH of medium was adjusted to 7.0 with ammonium hydroxide. It was diluted to 13.3 liters and placed in a 20 liters stainless steel fermentation jar. The medium in the jar was sterilized at 115° C. for 20 minutes, cooled and inoculated with 700 ml. of a seed liquor of *Brevibacterium divaricatum* (NRRL B–2312), which had been cultured 15 hours. Fermentation was carried out in the jar at 31° C. with aeration and agitation. During fermentation, gaseous ammonia was introduced into the jar together with the air so that the pH value of the culture medium was kept at approximately 7.8. When the growth of microorganism had raised the light absorbency (turbidity) to 0.32 five hours after inoculation, 84 grams glyceryl monostearate were added to the medium and fermentation was continued for 54 hours. The concentration of L-glutamic acid in fermentation liquid was 3.97 grams per deciliter.

Example 12

Cane molasses was dissolved in water, and diatomaceous earth was added to the solution, which was then filtered with suction. A culture medium was prepared from 6.6 liters of the clarified solution which contained 10.2 percent sucrose, and 14 grams potassium dihydrogen phosphate, and 5.6 grams magnesium sulfate heptahydrate. The pH of the medium was adjusted to 7.0 with ammonia. It was diluted to 13.3 liters and placed in a 20 liters stainless steel fermentation jar. The medium in the jar was sterilized at 115° C. for 20 minutes, cooled and inoculated with 700 ml. of a seed liquor of *Brevibacterium roseum* (ATCC No. 13825), which had been cultured 15 hours. Fermentation was carried out in the jar at 31° C. with aeration and agitation. During fermentation gaseous ammonia was introduced into the jar together with the air whereby the pH value of the culture medium was kept at approximately 7.8. When the growth of microorganism caused the absorbency of the medium to rise to 0.27, 60 grams Tween 60 were added and fermentation was continued for 42 hours. 645 grams of L-glutamic acid were collected from the broth.

*Example 13*

Crystals of raw cane sugar were dissolved in water. Diatomaceous earth was added to the solution which was then filtered. The filtrate was further diluted with water to a sucrose concentration of 10. g./dl. A culture medium was prepared from this solution by the addition of 0.2 g./dl. diammonium hydrogen phosphate, 0.04 g./dl. magnesium sulfate heptahydrate, 0.6 g./dl. urea and 0.3 g./dl. mixture of sucrose stearates (Nitto Ester 1009; brand name), a surface active agent. The pH of the medium was adjusted to 7.0 with aqueous ammonia solution. 20 ml. batches of the culture medium were placed in 500 ml. flasks, sterilized and inoculated with *Brevibacterium immariophillium* (ATCC No. 14068). The fermentation was permitted to proceed at 28–30° C. for 42 hours under shaking. An aqueous solution of urea was added to each flask during fermentation to keep the culture medium at pH 7.5–8.2. The concentration of L-glutamic acid in the fermentation broth was 3.24 g./dl.

*Example 14*

Beet molasses containing 47 g./dl. sucrose was diluted with water to approximately two times its initial volume. Diatomaceous earth was added to the diluted molasses which was then filtered. The filtrate was further diluted with water to a sucrose concentration of 10 g./dl. A culture medium was prepared from this solution by the addition of 0.1 g./dl. potassium dihydrogen phosphate, 0.04 g./dl. magnesium sulfate heytahydrate, and 0.6 g./dl. urea. The pH of the medium was adjusted to 7.0 with aqueous ammonia solution. 20 ml. batches of the culture medium were placed in 500 ml. flasks, sterilized at 120° C. for 15 minutes, and inoculated with *Brevibacterium lactofermentus*, strain No. 2256 (ATCC No. 13869), which had previously been cultured for 24 hours. The fermentation was permitted to proceed at 37° C. under shaking. An aqueous 45% solution of urea was added to each flask during fermentation to keep the culture medium slightly alkaline. 6.5 hours after inoculation the growth of the microorganism had raised the light absorbence to 0.40. At that time, 0.13 g./dl. Tween 60 were added to the fermentation medium, and fermentation was continued for 40 hours. The final concentration of the L-glutamic acid in the fermentation liquid was 4.89 g./dl.

*Example 15*

Beet molasses containing 47 g./dl. sucrose was diluted with water to approximately two times its initial volume. Diatomaceous earth was added to the diluted molasses which was then filtered. The filtrate was further diluted with water to a sucrose concentration of 10 g./dl. A culture medium was prepared from this solution by the addition of 0.1 g./dl. potassium dihydrogen phosphate, 0.04 g./dl. magnesium sulfate heptahydrate, and 0.6 g./ dl. urea. The pH of the medium was adjusted to 7.0 with aqueous ammonia solution. 20 ml. batches of the culture medium were placed in 500 ml. flasks, sterilized at 120° C. for 15 minutes, and inoculated with *Brevibacterium lactofermentus*, strain No. 2256 (ATCC No. 13869), which had previously been cultured for 24 hours. The fermentation was permitted to proceed at 30° C. under shaking. An aqueous 45% solution of urea was added to each flask during fermentation to keep the culture medium at pH 7.7. 7 hours after inoculation the growth of the microorganisms had raised the light absorbancy to 0.41 and 0.12 g./dl. polyoxyethylene palmitate were added to fermentation medium. Fermentation was continued for 52 hours. The ultimate concentration of L-glutamic acid in the fermentation liquid was 4.31 g./dl.

*Example 16*

Cane molasses containing 67 g./dl. sucrose was diluted with water to approximately two times its initial volume. Diatomaceous earth was added to the diluted molasses which was then filtered. The filtrate was further diluted with water to a sucrose concentration of 10 g./dl. A culture medium was prepared from this solution by the addition of 0.1 g./dl. potassium dihydrogen phosphate, 0.04 g./dl. magnesium sulfate heptahydrate, and 0.6 g./dl. urea. The pH of the medium was adjusted to 7.0 with aqueous ammonia solution. 20 ml. batches of the culture medium were placed in 500 ml. flasks, sterilized at 120° C. for 15 minutes, and innoculated with *Brevibacterium lactofermentus*, strain No. 2256 (ATTC No. 13869), which had previously been cultured for 24 hours. The fermentation was permitted to proceed at 33° C. under shaking. An aqeous 45% solution of urea was added to each flask during fermentation at a rate sufficietn to keep the culture medium at pH 7.09. 5.5 hours after inoculation, the growth of microorganism increased the light absorbency of the medium to 0.28, and 0.44 g./dl. polyoxyethylene octadecyl ether, a surface active agent, were added to the fermentation medium. Fermentation was continued for 44 hours. When fermentation was terminated, the concentration of L-glutamic acid in the fermentation liquid was 3.98 g./dl.

*Example 17*

Beet molasses containing 47 g./dl. sucrose was diluted with water to approximately two times its initial volume. Diatomaceous earth was added to the diluted molasses which was then filtered. The filtrate was further diluted with water to a sucrose concentration of 10 g./dl. A culture medium was prepared from this solution by the addition of 0.1 g./dl. potassium dihydrogen phosphate, 0.04 g./dl. magnesium sulfate heptahydrate, and 0.6 g./dl. urea. The pH of the medium was adjusted to 7.0 with aqueous ammonia solution. 20 ml. batches of the culture medium were placed in 500 ml. flasks, sterilized at 120° C. for 15 minutes, and inoculated with *Brevibacterium lactofermentus*, strain No. 2256 (ATCC No. 13869), which had previously been cultured for 24 hours. The fermentation was permitted to proceed at 30° C. under shaking. An aqueous 45% solution of urea was added to each flask during fermentation to keep the culture medium at pH 7.7. 7 hours after inoculation the growth of the microorganisms had raised the light absorbency to 0.30 and 0.10 g./dl. polyoxyethylene stearate (Nonion S–4; trademark) were added to fermentation medium. Fermentation was continued for 48 hours. The ultimate concentration of L-glutamic acid in the fermentation liquid was 4.77 g./dl.

While the invention has been described with particular reference to specific embodiments, it is to be understood that it is not limited thereto but is to be construed broadly and restricted solely by the scope of the appended claims.

What we claim is:

1. A process for preparing L-glutamic acid which comprises culturing a microorganism capable of producing L-glutamic acid from a nitrogen source and from sucrose as a carbon source on a medium containing as a carbon source a material selected from the group consisting of molasses, raw juice, and raw sugar derived from sugar beets and sugar cane, said medium further containing an effective amount of a non-ionic surface active agent smaller than the amount of said surface active agent which inactivates the glutamic acid producing enzyme in said microorganism.

2. A process as set forth in claim 1, wherein said surface active agent is a polyoxyethylene derivative of a monoester of sorbitan with an acid selected from the group consisting of lauric, palmitic, oleic, and stearic acid.

3. A process as set forth in claim 1, wherein said surface active agent is a monoester of sorbitan with a monocarboxylic acid having a straight carbon chain of 12 to 18 carbon atoms.

4. A process as set forth in claim 1, wherein said surface active agent is glyceryl monostearate.

5. A process as set forth in claim 1, wherein said surface active agent is an ester of a polyhydric aliphatic alcohol with a monocarboxylic acid having a straight carbon chain of 12 to 18 carbon atoms, said alcohol in said ester having free hydroxyl groups.

6. A process as set forth in claim 1, wherein said surface active agent is sucrose stearate.

7. A process as set forth in claim 1, wherein said surface active agent is polyoxyethylene palmitate.

8. A process as set forth in claim 1, wherein said surface active agent is polyoxyethylene octadecyl ether.

9. A process as set forth in claim 1, wherein said surface active agent is polyoxyethylene stearate.

10. A process as set forth in claim 1, wherein said microorganism is a Brevibacterium capable of producing L-glutamic acid.

References Cited in the file of this patent
UNITED STATES PATENTS

| | | |
|---|---|---|
| 3,003,925 | Kinoshita et al. | Oct. 10, 1961 |
| 3,036,958 | Asai et al. | May 29, 1962 |
| 3,063,914 | Polnitz et al. | Nov. 13, 1962 |